United States Patent
Chang et al.

(10) Patent No.: US 7,196,891 B2
(45) Date of Patent: Mar. 27, 2007

(54) CONTROL CIRCUIT FOR FREQUENCY CONVERTER

(75) Inventors: Chung-Chieh Chang, Hsinchu (TW); Lyman Tseng, Hsinchu (TW)

(73) Assignee: Macronix International Co., Ltd., Hsinchu (TW)

( * ) Notice: Subject to any disclaimer, the term of this patent is extended or adjusted under 35 U.S.C. 154(b) by 0 days.

(21) Appl. No.: 10/710,659

(22) Filed: Jul. 27, 2004

(65) Prior Publication Data
US 2005/0024804 A1    Feb. 3, 2005

(30) Foreign Application Priority Data
Jul. 29, 2003    (TW) ................ 92120626 A

(51) Int. Cl.
*H02H 3/24*    (2006.01)
*H02H 3/027*    (2006.01)
(52) U.S. Cl. ................ 361/92; 361/90; 361/91.3; 361/187
(58) Field of Classification Search ............. 361/92, 361/187, 90, 91.3
See application file for complete search history.

(56) References Cited

U.S. PATENT DOCUMENTS

| | | | | |
|---|---|---|---|---|
| 3,911,360 A | * | 10/1975 | Kimzey | 324/133 |
| 3,940,664 A | * | 2/1976 | Matsko | 361/92 |
| 4,031,463 A | * | 6/1977 | Norberg | 324/76.16 |
| 4,150,310 A | * | 4/1979 | Emile, Jr. | 327/33 |
| 4,306,265 A | * | 12/1981 | Kuntner et al. | 361/31 |
| 4,331,996 A | * | 5/1982 | Matsko et al. | 361/92 |
| 5,053,978 A | * | 10/1991 | Solomon | 702/54 |

* cited by examiner

*Primary Examiner*—Brian Sircus
*Assistant Examiner*—Z Kitov
(74) *Attorney, Agent, or Firm*—Jianq Chyun IP Office

(57) ABSTRACT

A control circuit for a frequency converter is provided. The control circuit includes a switch circuit, a timer switch, a starter circuit, a starter relay, and a timer relay. The control circuit is capable of keeping the frequency converter on for a predetermined time period when the voltage level of the power supply is below a predetermined voltage level in order to keep the equipment operating. After the lapse of the predetermined period, if the voltage level is still below the predetermined voltage level, the circuit stops to the operation of the equipment to protect the equipment.

3 Claims, 2 Drawing Sheets

CONTROL CIRCUIT FOR FREQUENCY CONVERTER

CROSS REFERENCE TO RELATED APPLICATIONS

This application claims the priority benefit of Taiwan application serial no. 92120626, filed Jul. 29, 2003.

BACKGROUND OF INVENTION

1. Field of the Invention

This invention generally relates to an auto control circuit for a frequency converter, and more particularly to an auto control circuit for operating an equipment in an abnormal voltage for a predetermined time period.

2. Description of Related Art

In the modern industrial era, the operation of the production line is a significant indication of the economic strength of a country. Hence, whether the smooth operation of equipments in the factories is an important issue. The core of the equipment in the factories is the driven motor. The frequency converter is widely used in the motors. Hence, the characteristics of the control circuit of the frequency converter are very important.

FIG. 1 illustrates a traditional control circuit of a frequency converter. Referring to FIG. 1, the traditional frequency converter includes a switch circuit 11, a starter circuit 12 and a starter relay 13. The switch circuit 11 can be turned on an off via starter circuit 12. The switch circuit 11 is connected to the starter relay 13 and the starter relay 13 controls the frequency converter 14 of the equipment 15.

When the voltage of the power supply to the traditional frequency converter is below a predetermined voltage level, the starter relay 13 will be turned off according to the IEEE446 standard. Hence, there is no output from the frequency converter 14 so that the equipment 15 stops working.

FIG. 2 is the characteristic curve during the operation of the frequency converter. Referring to FIG. 2, at time T1, the voltage level of the power supply starts to decrease. According to the IEEE446 standard, when the voltage level of the power supply is below 85% of the working voltage, the frequency converter stops output and thereby stopping the operation of the equipment. At time T5, the equipment completely stops. If the equipment stops due to the transient voltage drop, it would affect the production throughput.

SUMMARY OF INVENTION

The present invention is directed to a control circuit such that the circuit remains on for a predetermined time period when the voltage level of the power supply is below a predetermined voltage level so that the operation of the equipment is continued. After the lapse of the predetermined time period, if the voltage level is still below the predetermined voltage level, the circuit stops output to protect the equipment.

According to an embodiment of the present invention, the control circuit comprises a starter circuit, a switch circuit, a starter relay, a timer relay and a timer switch. The starter circuit is adapted for determining whether or not to turn on/off the control circuit. The starter circuit is adapted for determining whether or not to turn on/off the switch circuit. The starter relay is adapted controlling the frequency converter, wherein when a voltage level of a power supply to the control circuit is below a first predetermined voltage level, the starter relay is turned off, and when the voltage level of the power supply for the control circuit is above a second predetermined voltage level, the starter relay being turned on. When the voltage level of the power supply to the control circuit is below the first predetermined voltage level, the timer relay remain on for a predetermined time period. The timer relay is adapted for determining whether or not to turn on/off the timer switch. The timer switch and the switch circuit are connected in parallel as a first parallel circuit, the starter relay and timer relay are connected in parallel as a second parallel circuit,the first parallel circuit and the second circuit are connected in serial, and the starter circuit is coupled to the switch circuit.

In an embodiment of the present invention, the control circuit further comprises a stop-reset switch for determining whether or not to turn on the timer relay.

According to an embodiment of the present invention, although the starter relay will be off when there is a transient voltage drops to a level below a predetermined voltage, the timer relay will remain on for a predetermined time period. And, when the voltage level returns back to the normal level, the starter relay will be automatically turned on again.

The above is a brief description of some deficiencies in the prior art and advantages of the present invention. Other features, advantages and embodiments of the invention will be apparent to those skilled in the art from the following description, accompanying drawings and appended claims.

DETAILED DESCRIPTION

Figure 3:
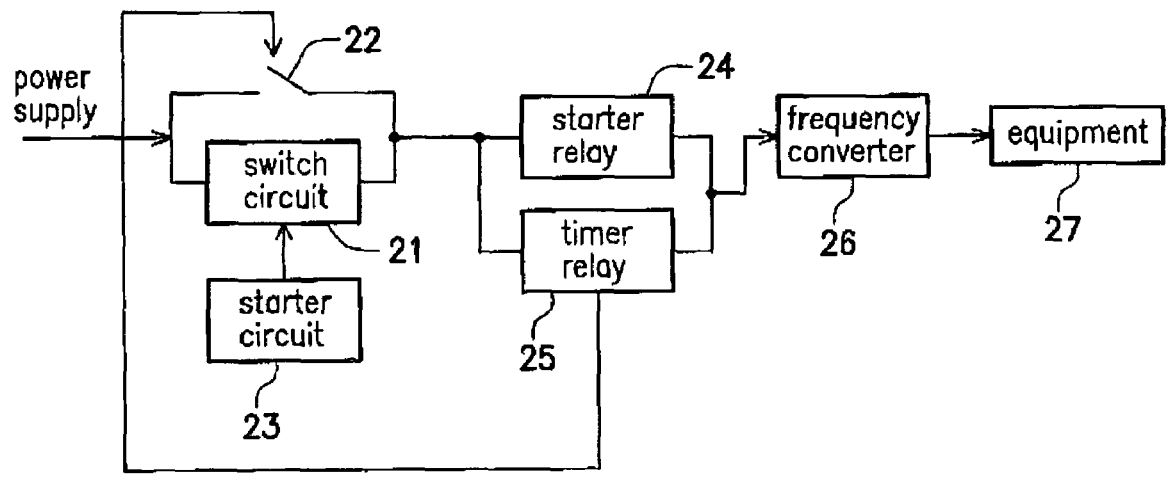
FIG. 3 is a block diagram of a control circuit of a frequency converter in accordance with a first embodiment of the present invention.

FIG. 3 is a block diagram of a control circuit of a frequency converter in accordance with a first embodiment of the present invention. The control circuit for the frequency converter includes a switch circuit 21, a timer switch 22, a starter circuit 23, a starter relay 24, a timer relay 25, a frequency converter 26, and the equipment 27. The starter circuit 23 is coupled to the switch circuit 21 and is adapted for determining whether or not to turn on the switch circuit 21. The timer switch 22 and the switch circuit 21 are connected in parallel forming a first parallel circuit, and the starter relay 24 and the timer relay 25 are connected in parallel forming a second parallel circuit. The first and second parallel circuit are connected in serial. The second parallel circuit including the starter relay 24 and the timer relay 25 is connected to the frequency converter 26. The frequency converter 26 is connected to the equipment 27. The starter relay 24 controls the output of the frequency converter 26 so that the equipment 27 can be operated.

In this embodiment, according to the IEEE446 standard, when the voltage level of the power supply is below a predetermined voltage level (in FIG. 3 it is 85%; hereinafter "the first predetermined voltage level"), the starter relay 24 is turned off so that the frequency converter stops outputting as a result the equipment begins to stop operating. At the same time, the timer relay 25 remains on for a predetermined time period for controlling the output of the frequency converter 26. If the voltage level of the power supply, according to the IEEE446 standard, rises to another predetermined voltage level (in FIG. 3 it is 70%; hereinafter "the second predetermined voltage level") during the predetermined period, the starter relay 24 is turned back on. According to the IEEE446 standard, when the voltage level of the power supply rises to above the first predetermined voltage level, the frequency converter 26 starts to output to operate the equipment 27. If the voltage level of the power supply to the control circuit do not rise to above the second predetermined voltage level during the predetermined period, the timer relay 25 is turned off. After the lapse of the predetermined time period, if the voltage level is still below the second predetermined voltage level, the timer relay 25 is turned off and the equipment 27 is turned off from a low revolution speed to protect the equipment 27 from damage.

Figure 1:
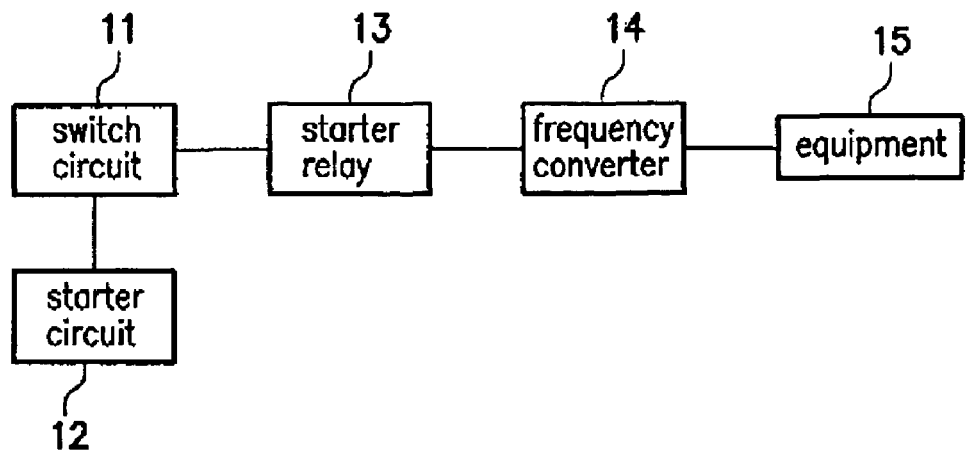
FIG. 1 is a traditional control circuit of a frequency convert.
Figure 2:
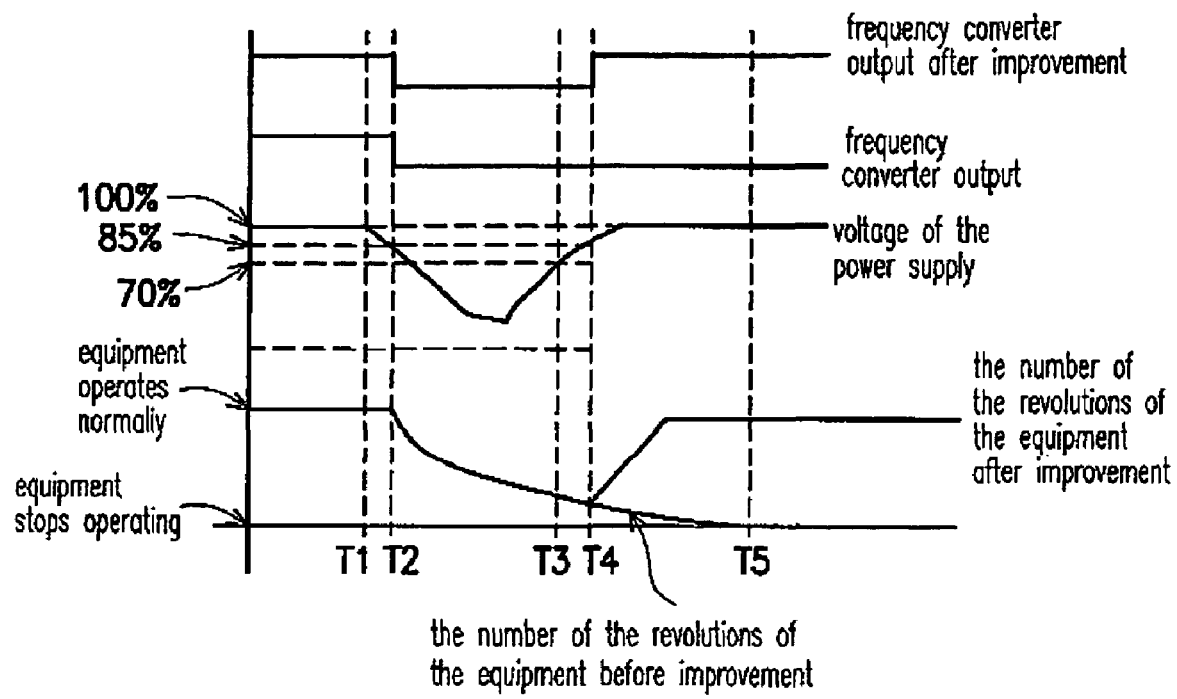
FIG. 2 is a characteristic curve duringan operation of the frequency converter.

FIG. 2 is a characteristic curve duringan operation of the frequency converter. Referring to FIG. 2, at time T1, the voltage level of the power supply begins to decrease. According to the IEEE446 standard, when the voltage level of the power supply is below 85% of the working voltage, the frequency converter stops output. Hence, the equipment begins to stop operating. If in a predetermined period (T2~T4), the voltage level of the power supply rises to 70% (T3), according to the IEEE446 standard, the starter relay will be turned on again. When the voltage level of the power supply rises to 85%, according to the IEEE446 standard, the frequency converter will be turned on again and the revolutions of the equipment will become normal.

Figure 4:
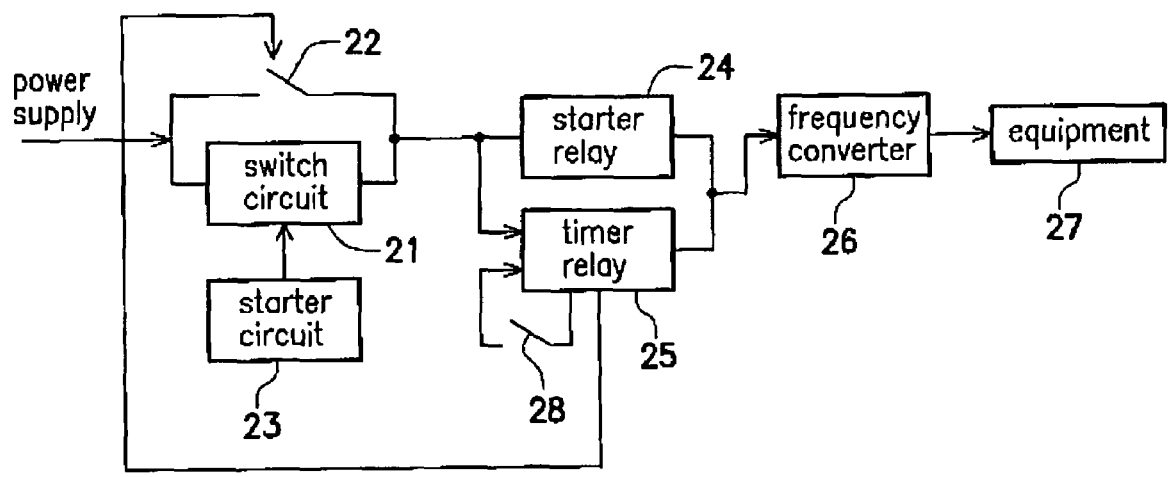
FIG. 4 is a block diagram of a control circuit of a frequency converter in accordance with a second embodiment of the present invention.

FIG. 4 is a block diagram of a control circuit of a frequency converter in accordance with a second embodiment of the present invention. Unlike the first embodiment this embodiment further includes a stop-reset switch 28 and the stop-reset switch 28 is connected to the timer relay 25 and is adapted for turning on or turning off the timer relay 25. That is, when the equipment 27 begins to stop operating, the stop-reset switch 28 can be turned off, which also accordingly turns off the timer relay 25. Therefore, even if the voltage level of the power supply is reduced to below the first predetermined voltage level and then rises again, the control circuit of the frequency converter will not be turned on automatically.

The above description provides a full and complete description of the preferred embodiments of the present invention. Various modifications, alternate construction, and equivalent may be made by those skilled in the art without changing the scope or spirit of the invention. Accordingly, above description and illustrations should not be construed as limiting the scope of the invention which is defined by the following claims.

The invention claimed is:

1. A control circuit, for controlling a frequency converter, said control circuit comprising:

a first parallel circuit, for receiving a power source being applied to said control circuit, said first parallel circuit comprising:

a switch circuit, being turned on or off by a starter circuit, and a timer switch, said timer switch and said switch circuit are connected in parallel to form said first parallel circuit; and a second parallel circuit, for turning on or off said frequency converter, wherein said first parallel circuit and said second parallel circuit are connected in series, said second parallel circuit comprising:

a starter relay, wherein when a voltage level of said power supply being applied to said control circuit is below a first predetermined voltage level, said starter relay is turned off, and when said voltage level of said power supply to said control circuit is raised to above a second predetermined voltage level, said starter relay is turned on; and a timer relay, wherein when said voltage level of said power supply being applied to said control circuit is below said first predetermined voltage level, said timer relay remains being turned on for a predetermined time period and said timer switch is turned on to keep said first parallel circuit on receiving said power source being applied to said control circuit, which keeps said frequency converter on, wherein during said predetermined time period, if said voltage level of said power supply is increased to reach said first predetermined voltage level, said frequency converter remaining turned on to keep said equipment being operated normally, wherein after said predetermined time period, if said voltage level of said power supply is still below said second predetermined voltage level, said timer relay is turned off and said frequency converter is also turned off.

2. The control circuit of claim 1, further comprising a stop-reset switch, for turn on said timer relay.

3. The control circuit of claim 1, wherein when said voltage level of said power supply to said control circuit rises to above the second predetermined voltage level during said predetermined time period, said starter relay is turned on automatically.

* * * * *